Figure 1:
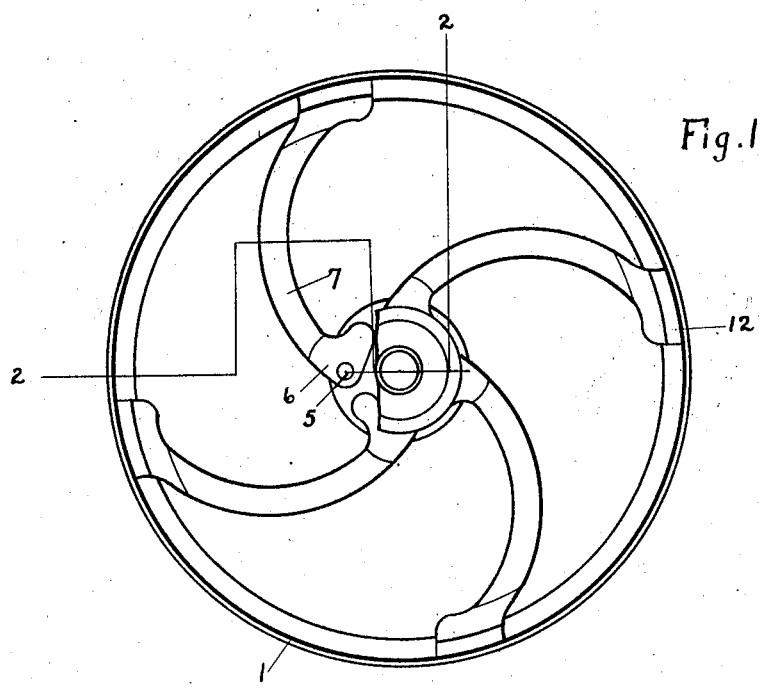

C. R. PIEPER.
FRICTION CLUTCH PULLEY.
APPLICATION FILED NOV. 8, 1917.

1,333,131.

Patented Mar. 9, 1920.

Inventor
Chester R. Pieper
by C. D. Enochs
Attorney

UNITED STATES PATENT OFFICE.

CHESTER R. PIEPER, OF LA CROSSE, WISCONSIN, ASSIGNOR TO GUND MANUFACTURING COMPANY, OF LA CROSSE, WISCONSIN, A CORPORATION OF WISCONSIN.

FRICTION-CLUTCH PULLEY.

1,333,131.  Specification of Letters Patent.  Patented Mar. 9, 1920.

Application filed November 8, 1917. Serial No. 200,993.

*To all whom it may concern:*

Be it known that I, CHESTER R. PIEPER, a citizen of the United States, and a resident of La Crosse, in the county of La Crosse and State of Wisconsin, have invented certain new and useful Improvements in Friction-Clutch Pulleys, of which the following is a specification.

One object of my invention is to provide in a friction clutch pulley means for starting the pulley rim slowly so that it will obtain its full driving speed without any sudden jerks.

Another object of my invention is to provide in a friction clutch pulley improved clutch means between the pulley rim and the driving member.

Another object of my invention is to provide in a friction clutch pulley an improved style of rim and a friction shoe co-acting therewith.

Another object of my invention is to provide in a friction clutch pulley having loose spokes, improved means for increasing the diameter of the circle described by the outer portions of the spokes.

With these and incidental objects in view the invention consists of certain novel features of construction and combination of parts, the essential elements of which are hereinafter described with reference to the drawing which accompanies and forms a part of this specification.

Figure 2:
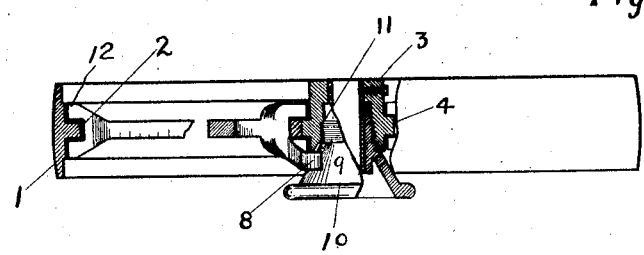

In the drawing Figure 1 is a side elevation of a pulley embodying my invention with a portion of the hand wheel broken away. Fig. 2 is a section taken on the line 2—2, Fig. 1.

I prefer to use a crown face pulley rim 1, having on its inner side a tongue 2 forming a T-section for the rim.

A hub 3, Fig. 2, has lugs 4 to which are hinged by pins 5, Fig. 1, the forked end 6 of the spokes 7.

The forked end of the spokes have extending therefrom lugs 8, Fig. 2, adapted to engage with a cone-shaped portion 9 of the hand wheel 10, which engages, by screw connection at 11, with the hub 3.

It is evident therefore that by screwing the hand wheel 10 inwardly, which may be done by merely grasping it while the hub 3 is being rotated, the lugs 8 are forced outwardly and with them the spokes 7.

The hub 3 would be fastened to and driven by an engine or motor shaft used to furnish power for the device with which the friction clutch pulley was used.

Each of the spokes 7 carries a shoe 12 at its outer end which is shaped to fit about the tongue 2 on the inner side of the rim, as plainly shown in Fig. 2.

It is apparent therefore that when the hand wheel is turned inwardly the shoes 12 will engage with the inner surface of the rim 1 and the tongue 2, and thereby rotate the rim 1 through the friction between the shoes and the rim.

The tongue 2 locates the rim on the loose spokes when the pulley is not being rotated and serves as a strong yet simple construction for uniting the rim with the loose spokes.

While I have described my invention and illustrated it in one particular design, I do not wish it understood that I limit myself to this construction, as it is evident that the application of my invention may be varied in many ways within the scope of the following claims.

I claim:

1. In a friction clutch pulley the combination of a hub, an internal hand wheel and conical clutch engaging surface carried by said hub by screw engagement, a plurality of spokes hinged to said hub, each of said spokes having a lug engaging with the cone-shaped portion of said hand wheel, a shoe carried by each of said spokes at their outer ends, and a rim having a T-shaped section riding on said shoes so that said shoes may be brought into frictional engagement with said rim by the relative movement of said hand wheel and said hub.

2. In a friction clutch pulley the combination of a free running rim, a hub having internal threads in one portion thereof, lugs projecting from the outer surface of said hub, a plurality of spokes hinged to said lugs and carrying shoes at their outer ends engageable with said rim, a hand wheel having a cone shaped portion engageable with the inner ends of each of said spokes and engaging with the threaded portion of said hub by screw connection whereby said shoes may be brought into engagement with the inner surface of said rim, and whereby the engagement of the cone shaped surface with the inner ends of said spokes may be positively released.

CHESTER R. PIEPER.